United States Patent Office 3,837,965
Patented Sept. 24, 1974

3,837,965
PORTABLE REPAIR APPARATUS
John Mahon, Huntington, and Stanley J. Richter, Blue Point, N.Y., assignors to the United States of America as represented by the Secretary of the Air Force
Filed Oct. 17, 1972, Ser. No. 298,209
Int. Cl. B32b 35/00
U.S. Cl. 156—382
2 Claims

ABSTRACT OF THE DISCLOSURE

A portable repair apparatus having a pair of chambers separated by a flexible diaphragm having a heating element therein. One chamber has a connection to an evacuating means while the other chamber is connected to a pressure source. After mounting the repair apparatus over a patch on the damaged area of a surface, the creation of a vacuum in one chamber and the increase in pressure in the other chamber causes the flexible diaphragm to apply sufficient pressure to the patch in order to bond it to the damaged surface.

BACKGROUND OF THE INVENTION

This invention relates generally to an apparatus for repairing damage in the outer skin of aircraft, and, more particularly, to an apparatus which utilizes an integral heat, vacuum and pressure repair apparatus for accomplishing this repair.

In the past it was an extremely complicated, time consuming and expensive procedure to repair any structural damage done to the skin of an aircraft. To perform such repair work on an aircraft usually required the movement of the damaged aircraft to a hangar in which a series of complicated mending operations took place. Furthermore, in the past it was extremely difficult to work with typical aircraft materials such as boron, graphite, fiberglass-epoxy materials, aluminum or titanium. Repairs in such materials usually required specialized equipment and in many instances this type of equipment was unavailable at the site where an aircraft was to be repaired. Only minor repairs were able to be performed on the aircraft itself without removing it from operation for an extended period of time.

SUMMARY OF THE INVENTION

The instant invention sets forth a portable repair apparatus which is useful in overcoming the difficulties set forth hereinabove in the repair of aircraft in the field. Furthermore, this repair apparatus is not limited merely to aircraft in which it finds its most essential use, but can be utilized on any surface repairs necessary on a variety of equipment.

The portable repair apparatus of this invention is utilized in conjunction with a suitable repair patch such as a titanium foil doubler patch. The apparatus itself is made up of two chambers, a vacuum chamber and a pressure chamber. It should be noted, however, that under conditions where a pressure of one atmosphere or less is necessary the pressure chamber may be omitted. The vacuum chamber, which is located adjacent the skin of an aircraft having the damage therein, comprises a flexible diaphragm which is sealed by an integral vacuum seal to the body of the aircraft or other equipment. This seal completes the enclosure around the damage which is generally in the form of a hole to be repaired. Air is evacuated through an outlet connected to the vacuum chamber which causes the diaphragm to conform to and exert a pressure upon the repair patch placed over the damaged area. This pressure causes a sealing action to take place between the patch and the body to be repaired. A heating element is integrally formed within the diaphragm and is utilized to simultaneously apply heat on the surface to be repaired in order to speed any curing required.

The pressure chamber is formed between the flexible diaphragm and a rigid outer shell. Fluid pressure is introduced into the pressure chamber through an inlet after the vacuum is developed in the vacuum chamber and thereby produces a pressure upon the body to be repaired in excess of one atmosphere. Such an additional pressure may be required under certain circumstances.

The repair apparatus of this invention can be utilized with a variety of materials such as boron, graphite, fiberglass-epoxy materials, aluminum and titanium in conjunction with a titanium foil repair patch to offer an easy repair system for the most complex of skin curvatures. The repair apparatus of this invention furthermore, does not require extensive training in its use nor does it require the complete isolation of the article to be repaired.

It is therefore an object of this invention to provide a portable repair apparatus which is capable of applying a uniform pressure to a contoured shape in order to apply a repair patch to any damage thereto.

It is another object of this invention to provide a portable repair apparatus which is capable of performing in-field applications.

It is still a further object of this invention to provide a portable repair apparatus which is capable of utilizing a heat source within its system.

It is a further object of this invention to provide a portable repair apparatus which is economical to produce and which utilizes conventional, currently available components that lend themselves to standard mass producing manufacturing techniques.

For a better understanding of the present invention together with other and further objects thereof, reference is made to the following description taken in connection with the accompanying drawing and its scope will be pointed out in the appended claims.

DETAILED DESCRIPTION OF THE PREFERRED EMBODIMENTS

Figure 1:
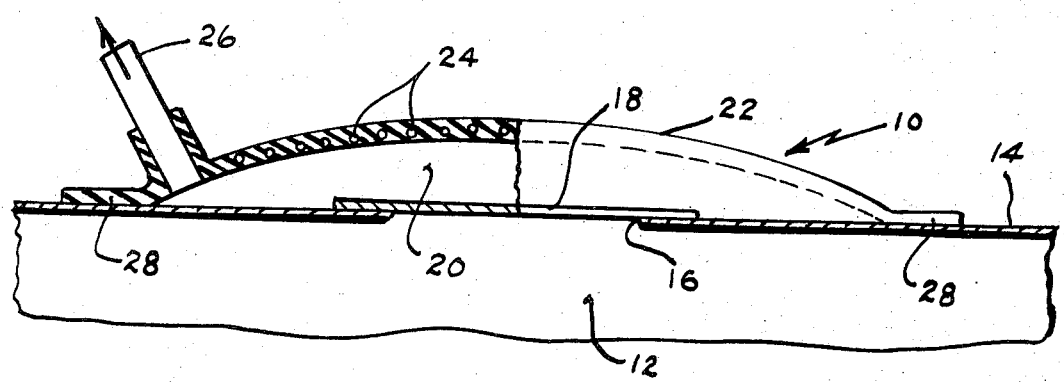
FIG. 1 is a side elevational view, shown partly in cross section of the portable repair apparatus of this invention mounted on the body of an article to be repaired.

Reference is now made to FIG. 1 of the drawing which shows the portable repair apparatus 10 of this invention mounted upon any type of equipment 12 such as an aircraft in which there is damage to the outer skin surface 14. The portable repair apparatus 10 shown in FIG. 1 is utilized when one atmosphere or less of pressure is required to secure a repair patch to the damaged area 16 in the outer skin surface 14. Any suitable repair patch 18 such as a titanium foil doubler patch may be utilized in conjunction with the repair apparatus 10 of this invention. The repair patch is positioned over the damaged area 16 before mounting of repair apparatus 10 takes place.

The repair apparatus 10 of the present invention is made up of a vacuum chamber 20 enclosed by a flexible diaphragm 22 made of any suitable material such as rubber. A heating coil 24 is embedded within diaphragm 22 and is connected to any conventional electrical source not shown. Chamber 20 further has an outlet 26 at one end thereof connected to any suitable vacuum source (not shown). Upon the placement of the portable repair apparatus 10 over the damaged area 16 of the equipment to be repaired, a vacuum is created within chamber 20 in order to form a seal between flange 28 and the outer skin surface 14 of equipment 12. This vacuum within chamber 20 causes the diaphragm 22 to be drawn upon the repair patch 18 and to furthermore conform to any curvature within surface 14. A pressure of one atmosphere may be exerted upon patch 18 in this manner. This pressure in conjunction with the heat supplied through coils 24 causes a bonding action to take place between the outer skin surface 14 and the repair patch 18 which is sufficient to repair the damage 16 therein.

Figure 2:
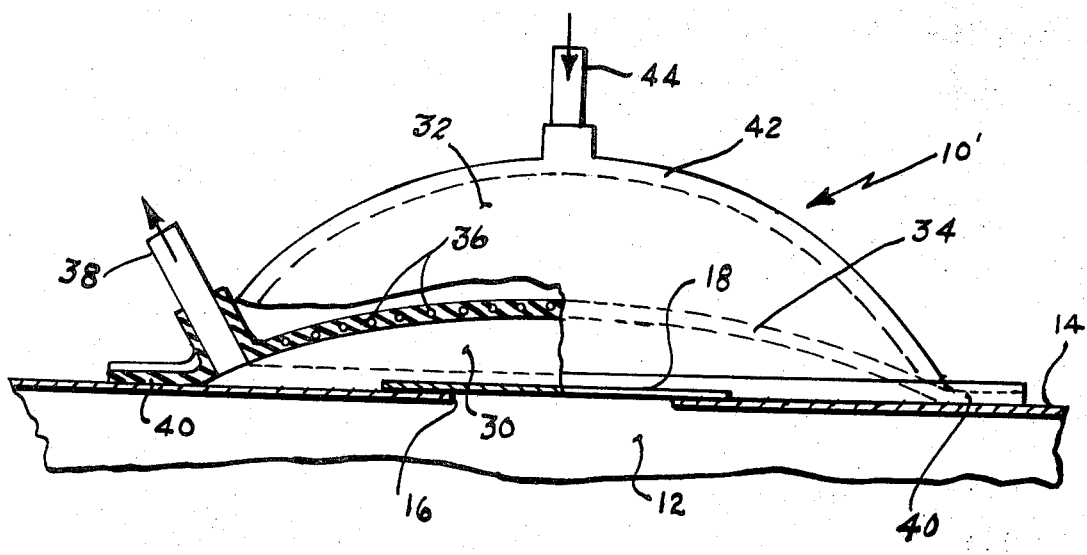
FIG. 2 is a side elevational view, shown partly in cross section of another embodiment of the portable repair apparatus of this invention.

FIG. 2 represents the modified portable repair apparatus 10' of this invention which is utilized when it is necessary to apply a repair patch 18 with a pressure greater than one atmosphere. As discussed with respect to FIG. 1, the repair patch 18 is placed upon the skin surface 14 of any article 12 to be repaired, sufficiently covering the damaged area 16 therein. The portable repair apparatus 10' of FIG. 2 differs from apparatus 10 of FIG. 1 in that it is made up of two chambers, a vacuum chamber 30 and a pressure chamber 32. The vacuum chamber has a resilient outer shell or diaphragm 34 which contains therein any suitable heating coil 36 connected to an electrical source not shown. A vacuum outlet 38 similar to that shown in FIG. 1 is connected to any suitable vacuum source. Flange 40 secures apparatus 10 to skin surface 14 upon the application of a vacuum within chamber 30 in the manner set forth with respect to FIG. 1. Fixedly secured upon flange 40 of vacuum chamber 30 is a pressure chamber 32 encompassed by any suitable rigid material 42 and having an inlet 44 therein connected to any suitable pressure source (not shown). After following the procedure set forth with regard to FIG. 1 of creating a vacuum within chamber 30 so that diaphragm 34 conforms to the configuration of outer skin surface 14 as well as applying a pressure of up to one atmosphere to the repair patch 18, additional pressure can be introduced through inlet 44. It is possible to increase the pressure within chamber 32 to any amount necessary for the complete bonding action to take place between patch 18 and surface 14. Heat may also be applied at any time during the vacuum or pressure operation.

MODE OF OPERATION

An example of the utility of the portable repair apparatus 10 or 10' of this invention is best illustrated by the following example:

If the honeycomb skin panel or outer surface 14 of an aircraft 12 is damaged by a projectile or the like, in the systems in use in the past, it would not be necessary to remove the aircraft from the landing area in order to repair the damage. With the repair apparatus 10 or 10' of this invention this procedure is eliminated. Any repair can be made directly in-field. First, the damaged area is inspected removing any debris. The damaged area 16 is then filled with epocast 1310 to skin level and the area cleaned by sanding and wiping the surface with a solvent. A prepackaged patch 18 such as a titanium foil doubler patch is applied to the damaged area 16. The portable repair apparatus 10 or 10' is now placed over the damaged area and held in place until a suitable vacuum is formed between chamber 20 or 30 and the outer surface 14 of the aircraft. Sufficient vacuum could be applied and a regulated heat temperature could be administered in order to create sufficient pressure to bond the patch 18 over the damaged area. If additional pressure were required, this pressure would enter through inlet 44 until the bonding action took place. After a predetermined period of time the portable repair apparatus is removed, the damaged area inspected and tested and the aircraft would again be ready for service.

Although this invention has been described with reference to particular embodiments it will be understood to those skilled in the art that this invention is also capable of a variety of alternative embodiments within the spirit and scope of the appended claims.

We claim:

1. A portable repair apparatus comprising a flexible diaphragm having a flange on the outer surface thereof, a first chamber being formed between said diaphragm and a surface on which said diaphragm is mounted, a heating coil mounted within said diaphragm, an outer shell surrounding said diaphragm forming a second chamber between said outer shell and said diaphragm, an outlet secured to said diaphragm for withdrawing the air from within said first chamber thereby creating a vacuum therein, causing said first diaphragm to be drawn against said surface in order to attach a patch thereto and an inlet secured to said shell for allowing fluid to enter into said second chamber thereby causing an increase in pressure on said flexible diaphragm and said patch.

2. A portable repair apparatus as defined in claim 1, wherein said outer shell is made of a rigid material.

References Cited

UNITED STATES PATENTS

| | | | |
|---|---|---|---|
| 3,575,756 | 4/1971 | Maus | 156—382 |
| 2,987,098 | 6/1961 | Daniel | 156—94 |
| 3,661,683 | 5/1972 | Engel et al. | 156—580 |
| 3,146,148 | 8/1964 | Mitchelle | 256—382 |

CHARLES E. VAN HORN, Primary Examiner

C. WESTON, Assistant Examiner

U.S. Cl. X.R.

100—211; 156—94, 580